(12) United States Patent
Arbajian

(10) Patent No.: US 7,676,470 B2
(45) Date of Patent: Mar. 9, 2010

(54) SELF DISCOVERING ADAPTIVE SECURITY SYSTEM AND METHOD

(75) Inventor: Pierre E. Arbajian, Matthews, NC (US)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 11/189,522

(22) Filed: Jul. 26, 2005

(65) Prior Publication Data

US 2007/0027871 A1    Feb. 1, 2007

(51) Int. Cl.
  *G06F 17/30* (2006.01)
(52) U.S. Cl. .............. 707/9; 707/3; 707/4; 707/10; 707/104.1; 713/166; 715/741; 726/4; 726/27
(58) Field of Classification Search ............. 707/9, 707/3, 4, 10, 104.1; 726/27, 4; 715/741; 713/166
  See application file for complete search history.

(56) References Cited

U.S. PATENT DOCUMENTS

| | | | |
|---|---|---|---|
| 5,751,949 A * | 5/1998 | Thomson et al. .......... | 726/4 |
| 5,787,428 A * | 7/1998 | Hart ....................... | 707/9 |
| 6,295,605 B1 | 9/2001 | Dockter et al. | |
| 6,738,790 B1 * | 5/2004 | Klein et al. .............. | 707/203 |
| 7,233,959 B2 * | 6/2007 | Kanellos et al. ......... | 707/104.1 |
| 2002/0069077 A1 * | 6/2002 | Brophy et al. ............ | 705/1 |
| 2002/0144106 A1 | 10/2002 | Enomoto | |
| 2003/0065662 A1 | 4/2003 | Cosic | |
| 2003/0097574 A1 | 5/2003 | Upton | |
| 2003/0119484 A1 | 6/2003 | Adachi et al. | |
| 2003/0191944 A1 | 10/2003 | Rothrock | |
| 2003/0204632 A1 | 10/2003 | Willebeek-LeMair et al. | |
| 2004/0044655 A1 * | 3/2004 | Cotner et al. ........... | 707/3 |
| 2004/0073565 A1 * | 4/2004 | Kaufman et al. ......... | 707/101 |
| 2004/0088561 A1 | 5/2004 | Dettinger et al. | |
| 2004/0117622 A1 | 6/2004 | Marquet et al. | |
| 2004/0181460 A1 | 9/2004 | Bjelogrlic et al. | |
| 2005/0066192 A1 * | 3/2005 | Handy Bosma et al. ..... | 713/201 |
| 2005/0188421 A1 * | 8/2005 | Arbajian ................. | 726/4 |
| 2006/0026180 A1 * | 2/2006 | Kres ...................... | 707/100 |
| 2006/0149739 A1 * | 7/2006 | Myers .................... | 707/9 |
| 2006/0167850 A1 * | 7/2006 | Fish et al. ............... | 707/3 |

\* cited by examiner

*Primary Examiner*—Shahid A Alam
*Assistant Examiner*—Phong Nguyen
(74) *Attorney, Agent, or Firm*—Norman Gundel; Hoffman Warnick LLC

(57) ABSTRACT

A system and method for providing security to a data warehousing application. A system is described having: a dimension analysis system that identifies dimensions defined for viewing data in a data warehouse; a security table generation system for automatically generating security tables for identified dimensions; a security tables scanning system for analyzing inputs within the security tables; and an end-user view definitions update system for updating the data warehouse based on inputs in the security tables.

5 Claims, 2 Drawing Sheets

SELF DISCOVERING ADAPTIVE SECURITY SYSTEM AND METHOD

BACKGROUND OF THE INVENTION

1. Technical Field

The present invention relates generally to data security, and more specifically relates to a self discovering adaptive security system and method for securing data in a data warehouse.

2. Related Art

Data warehousing applications remain a critical management tool for organizations. Such applications allow users the flexibility to view data about the organization using different views that provide important information about certain operations. For instance, a view may be defined that shows sales by region for a group of salespeople. Another view may show units sold by division over time. In a typical data warehousing application, views are defined to display data based on a set of dimensions, e.g., region, sales, salespeople, etc.

However, data warehousing applications tend to face the recurring question of data security and more specifically, how to manage and secure the various dimensions for different users, or groups of users, e.g., what departmental data is accessible to which users, what business sectors are off limits to all but the explicitly authorized users, etc. Users are granted or denied data access based on a set of end-user view definitions. Problems associated with implementing and managing end-user view definitions become particularly complex as new dimensions are added to the data warehouse and/or security requirements for the existing dimensions are changed.

In the current state of the art, whenever security changes are required, or new dimensions are added, the development team has to go back to the drawing board and enable new data security constraints and filters. Existing solutions typically call for extensive meetings between the stake holders every time there is a need for a change in data access restrictions, whether those changes call for an expansion or reduction in data security constraints or filters. Unfortunately, this approach is time consuming, costly and error prone. Accordingly, a need exists for a system and method that can more effectively manage end-user view definitions in a data warehousing application.

SUMMARY OF THE INVENTION

The present invention addresses the above-mentioned problems, as well as others, by providing a self discovering adaptive security system and method for securing data in a data warehouse. The invention provides a system and method that allows flexible, adaptive and self generating data security changes on a set of end-user view definitions based on security constraints enforced against existing data dimensions in an ad hoc manner.

In typical data warehousing environment security administration scenarios, the set of filters is dependent on pre-defined data access restrictions and any changes to previously defined restrictions are carried through a series of requirements gathering efforts, thus engaging the data warehouse developers who update the definition of the end user views and creating a set of data tables to reflect the updated security requirements and the redefined end-user views.

This invention describes a simpler, more flexible and less error prone approach to allow data warehouse security constraints to be augmented or diminished with minimal efforts through, e.g., the periodic execution of a security layout and data discovery process that is based on a review of: (1) dimensions defined for end-user views; and (2) a set of security tables and their content.

In a first aspect, the invention provides a system for providing security to a data warehousing application, comprising: a dimension analysis system that identifies dimensions defined for viewing data in a data warehouse; a security table generation system for automatically generating security tables for identified dimensions; a security tables scanning system for analyzing inputs within the security tables; and an end-user view definitions update system for updating end-user view definitions for the data warehouse based on inputs in the security tables.

In a second aspect, the invention provides a program product stored on a computer readable medium for providing security to a data warehousing application, comprising: program code configured for identifying dimensions defined for viewing data in a data warehouse; program code configured for automatically generating security tables for identified dimensions; program code configured for analyzing inputs within the security tables; and program code configured for updating end-user view definitions for the data warehouse based on inputs in the security tables.

In a third aspect, the invention provides a method for providing security to a data warehousing application, comprising: identifying dimensions defined for a set of end-user view definitions for viewing data in a data warehouse; automatically generating security tables for identified dimensions; analyzing inputs within the security tables; and updating the end-user view definitions for the data warehouse based on inputs in the security tables.

In a fourth aspect, the invention provides a method for deploying a security system for a data warehouse, comprising: providing a computer infrastructure being operable to: identify dimensions defined for a set of end-user view definitions for viewing data in a data warehouse; automatically generate security tables for identified dimensions; analyze inputs within the security tables; and update the end-user view definitions for the data warehouse based on inputs in the security tables.

In a fifth aspect, the invention provides computer software embodied in a propagated signal for implementing a security system for a data warehouse, the computer software comprising instructions to cause a computer to perform the following functions: identify dimensions defined for a set of end-user view definitions for viewing data in a data warehouse; automatically generate security tables for identified dimensions; analyze inputs within the security tables; and update the end-user view definitions for the data warehouse based on inputs in the security tables.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
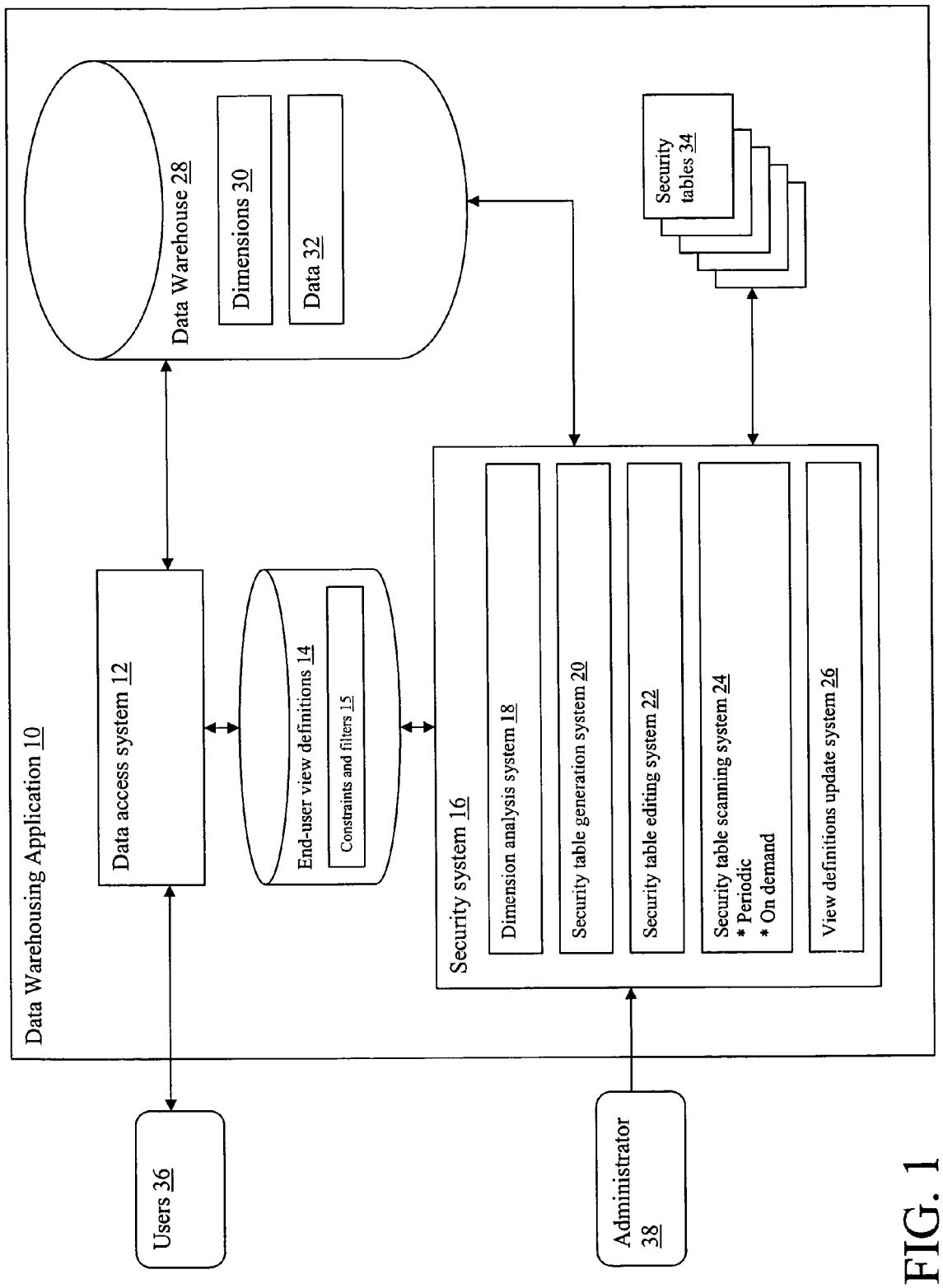
FIG. 1 depicts a data warehousing application in accordance with an embodiment of the present invention.

Referring to FIG. 1, a data warehousing application 10 is shown that includes a data access system 12 that provides access to a data warehouse 28 for users 36. Data warehouse 28 includes any number of dimensions 30 that can be used to display data 32. The manner in which the data 32 can be displayed is dictated by a set of end-user view definitions 14, which define various "views." In one illustrative embodiment, a view comprises a spreadsheet-like interface in which the dimensions 30 appear as column or row field labels on the spreadsheet, and the data appears adjacent the labels in the body of the spreadsheet. The end-user view definitions 14 also include any number of constraints and filters 15, which limit/grant data access to the users 36.

Security system 16 provides the mechanism for managing and implementing the security requirements associated with the end-user view definitions 14. In particular, as described in further detail below, security system 16 provides various functionality, including updating the available range of security constraints and filters 15 following the addition or deletion of dimensions in the data warehouse 28 and updating the end-user view definitions 14 based on the presence of data in a set of security tables 34.

In accordance with an illustrative embodiment of the invention, each defined dimension has at least one associated security table, and each security table may include constraint inputs and filter inputs, which ultimately are used to create the constraint and filter definitions 15 in the end-user view definitions 14. Filter inputs in the security tables 34 are used to grant a user (or group of users) implicit access to a subset of data as long as such data does not have special viewing restrictions that demand explicit access privileges. In the case of data areas that require explicit data access, implicit access will not grant the user data access. Explicit data access is a constraint that can be placed on areas of data that are more sensitive and more restricted and therefore require explicit access permission. The areas of data that have access constraints are defined using constraint inputs in the security tables 34.

For example, a data warehouse user may be granted access to all U.S. sales data on an implicit basis, but within the U.S. sales data there may be military sales records that are defined as "highly sensitive" records, for which explicit access should be required. To implement this, a security table associated with a U.S. sales dimension is provided and can be readily edited to include filter inputs to identify who has implicit access to the data, and constraint inputs that define records requiring explicit access. The process of implementing and managing the security tables 34 is handled by security system 16.

Security system 16 includes: a dimension analysis system 18, which can periodically or on demand identify the existence/addition/removal of dimensions 30 defined in the end-user view definitions 14 (or data warehouse 28); a security table generation system 20 that can automatically generate security tables 34 based on the existence or addition of a dimension as determined by the dimension analysis system 18; a security table editing system 22 that allows an administrator 38 or the like to edit security tables 34 with any necessary security definitions; a security table scanning system 24 that periodically or on demand scans the security tables 34 for security definitions; and a view definitions update system 26 that can apply the results of the security table scanning system 24 to update the end-user view definitions 14. These various systems are described in further detail below.

As noted above, each dimension has at least one associated security table. Dimension analysis system 18 is responsible for examining the end-user view definitions 14 to account for all of the defined dimensions. In particular, dimension analysis system 18 scans the entire set of views to ensure that each dimension has an associated security table or tables. Dimensions that have the required associated security tables are considered "data access security enabled." Those dimensions that are not data access security enabled are noted so that the necessary security tables can be created. The scanning process can be implemented periodically or as needed to account for newly added or removed dimensions.

For those dimensions that do not have associated security tables, new tables are automatically created by security table generation system 20. Initially, any newly generated security table is left empty. Inputs or edits to the security table, can be effectuated by security table editing system 22. Security table editing system 22 may be implemented in any fashion, e.g., via a word processor, a graphical user interface, etc.

Security table scanning system 24 provides periodic or on demand scanning of all of the security tables 34 to process inputs in the security tables 34. Empty security tables may be ignored, and security tables 34 with inputs are processed. Inputs from the security tables 34 are converted into format that is used for the constraints and filters 15 within the end-user view definitions 14. View definitions updating system 26 is responsible for updating the end-user view definitions 14 with any new constraints and filters 15.

Accordingly, any time a new dimension is added, security system 16 will automatically identify the dimension and create the necessary security table/tables. As the security demands for that dimension (or any other dimension) change, an administrator can edit the appropriate security table to effectuate the necessary security. The inputs from the security tables 34 are automatically/periodically scanned to incorporate the security requirements into the end-user view definitions 14. Thus, a self-discovering adaptive security process is provided.

Figure 2:
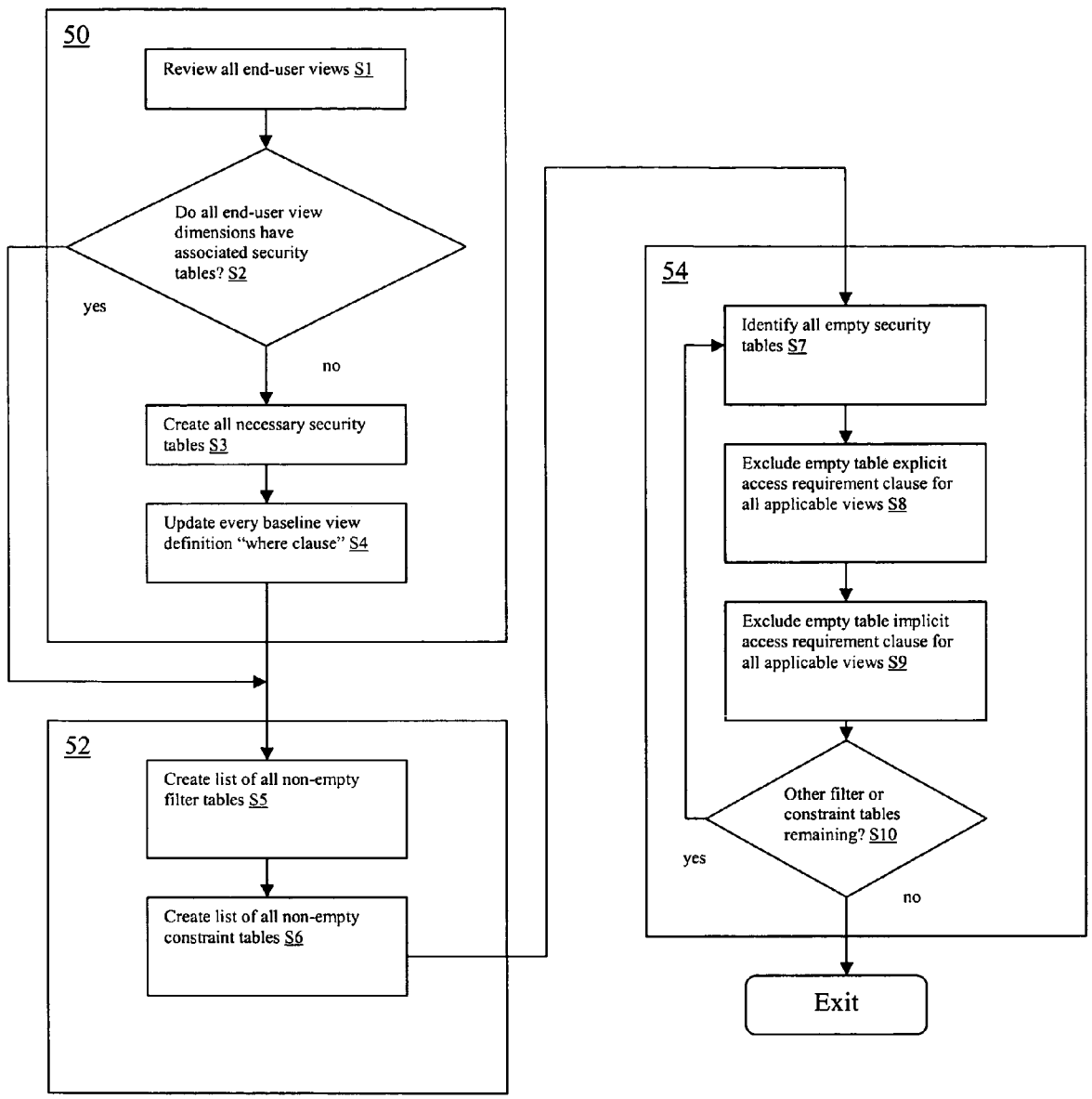
FIG. 2 depicts a flow diagram of an illustrative embodiment of the present invention.

Referring now to FIG. 2, a flow diagram of an illustrative embodiment of the invention is provided. In this embodiment, end-user view definitions 14 are implemented with SQL "where clauses," as is readily understood in the art. For example, if an employee is to be qualified for access to a division's data, then the logical function of the related "where clause" in the end-user view definitions 14 would be: where employee 'EMP1' exists in the list of the division's security table for division 'DIV1'. As a result, every record in the table is tested for inclusion in a view based on the identity of the database user.

In this embodiment, each view dimension is associated with a separate constraint table (for explicit security requirements) and filter table (for implicit security requirements). Also, this embodiment utilizes an exclusion based view definition generation approach in order to ensure that all security constraints are by default included in case of a process failure. Thus, if a class of data records is to be excluded from all but a few database users, then those data records are tagged as "Explicit Security Requiring Data." Thus, if a view within the data warehouse application 10 included division data within a country, and one of the divisions related to defense contract data that required explicit security, then any database users having access to this division must have a specifically authorized access, e.g., identified as division='defense contacts,' and users with implicit access to an entire country's data would not be eligible to see those records.

As can be seen, the embodiment comprises three stages, 50, 52 and 54. Stage 50 provides the stage at which "where clause" baselines are prepared in accordance with the following steps. A where clause baseline is a "where clause" that assumes that every dimension is to be secured. For the purpose of execution simplicity, the "where clause" is reduced in scope based on the dimensions needed in the security scheme.

First, all end-user views are reviewed at step S1. At step S2, a check is made to see whether all end-user view dimensions have associated security tables 34. If no, all necessary security tables are created at step S3 and every baseline view definition where clause is updated. In one embodiment, at this stage 50, a daily update process can be implemented to review the list of those fields identified as dimensions in the end-user view definitions 14 in order to enable the data warehouse 28 with data access security for every dimension 30. In this embodiment, security enablement of a dimension comprises the creation of two security tables, a filter table for implicit access and a constraint table for explicit security requirements.

Stage 52 provides the stage at which the security tables 34 are scanned. As shown, this includes the steps of creating a list of all non-empty filter tables at step S5, and creating a list of all non-empty constraint tables at step S6. Note that the mere presence of a security table does not indicate that the implied security is desired or implemented. An empty security table indicates that security is enabled, but not used. This stage 52 therefore identifies the security tables that need not be used in the views' "where clause."

Stage 54 provides the stage at which the system cycles through the security layout findings (i.e., inputs in the non-empty tables) and updates the end-user view definitions 14. This stage includes identifying all empty security tables at step S7, and excluding empty table explicit access requirement (i.e., constraint) clauses for all applicable views at step S8. For example if the dimensions 'dim1,' 'dim2,' and 'dim3' exist, then the baseline "where clause" would say: 'THE USER HAS ACCESS TO 'dim1' AND THE USER HAS ACCESS TO 'dim2' AND THE USER HAS ACCESS TO 'dim3.' However, since not all dimensions need to be secured, then further review by the view definitions update system 26 would change the "where clause" to include only those dimensions with interest to the security scheme, i.e., 'USER HAS ACCESS TO 'dim2' AND USER HAS ACCESS TO 'dim3.' At step S9, empty table implicit access requirement (i.e., filter) clauses are likewise excluded for all applicable views. At step S10, the system cycles/checks for additional tables. At this stage 50, the views "where clause" modifications are performed against the baseline where clause for each of the end user views. The absence of relevant data in the security tables 34 results in a deletion of SQL code from the baseline view definition.

In general, data warehousing system 10 and/or security system 16 can be implemented on any type of computer system, e.g., as a standalone system or of a client and/or a server. Such a computer system generally includes a processor, input/output, memory, a bus, etc. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Additional components, such as cache memory, communication systems, system software, etc., may be incorporated into such a computer system.

Access to the data warehousing application 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment. Data warehouse 28 may comprise any type of database, and may likewise reside at a single location, or be distributed over a network.

It should be also appreciated that the teachings of the present invention could be offered as a business method on a subscription or fee basis. For example, a data warehousing application 10 comprising security system 16 could be created, maintained and/or deployed by a service provider that offers the functions described herein for customers. That is, a service provider could offer to provide a security system for managing end-user view definitions as described above.

It is also understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for providing security to a data warehousing application, comprising:

identifying a dimension(s) defined for a set of end-user view definitions for viewing data in a data warehouse, wherein the step of identifying dimensions is automatically performed on a periodic basis or on demand;

examining each dimension for an associated security table, wherein the examining identifies each dimension without an associated security table;

generating security tables for identified dimensions without an associated security table;

scanning security tables to analyze inputs within the security tables, wherein the step of analyzing inputs is performed on a periodic basis or on demand;

converting the inputs to at least one of constraint(s) or filter(s) within the end-user view definition, wherein a constraint requires a user(s) to have an explicit access permission, and wherein a filter grants the user(s) implicit access; and updating the end-user view definitions for the data warehouse, wherein the updating is based on the analyzing inputs within the security tables.

2. The method of claim 1, wherein at least one security table is generated for each identified dimension defined for a set of end-user view definitions for viewing data in a data warehouse.

3. The method of claim 1, wherein a first security table associated with each dimension is configured for holding filter inputs for defining implicit access to an associated dimension.

4. The method of claim 1, wherein a second security table associated with each dimension is configured for holding constraint inputs for defining explicit security requirements for an associated dimension.

5. The method of claim 1, further comprising the step of editing the security tables.

* * * * *